US009523562B2

(12) United States Patent
Ando et al.

(10) Patent No.: US 9,523,562 B2
(45) Date of Patent: Dec. 20, 2016

(54) AERIAL VEHICLE AND OPERATING METHOD OF AERIAL VEHICLE

(71) Applicant: MITSUBISHI HEAVY INDUSTRIES, LTD., Tokyo (JP)

(72) Inventors: Keisuke Ando, Tokyo (JP); Yoshihiko Ueno, Tokyo (JP); Yoshihiro Sera, Tokyo (JP); Shojiro Furuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/672,531

(22) Filed: Mar. 30, 2015

(65) Prior Publication Data
US 2015/0276363 A1    Oct. 1, 2015

(30) Foreign Application Priority Data
Mar. 31, 2014  (JP) .................................. 2014-074549

(51) Int. Cl.
*F42B 15/01*    (2006.01)
*G05D 1/10*    (2006.01)

(52) U.S. Cl.
CPC ............... *F42B 15/01* (2013.01); *G05D 1/107* (2013.01)

(58) Field of Classification Search
CPC ...... G05D 1/08; G05D 1/0808; G05D 1/0816; G05D 1/0825; G05D 1/0883
See application file for complete search history.

(56) References Cited

U.S. PATENT DOCUMENTS

| 4,623,106 | A  | * | 11/1986 | Price, Jr. ................. | F42B 15/00 |
| | | | | | 244/158.9 |
| 8,725,470 | B1 | * | 5/2014  | Brown ................. | G06F 17/5009 |
| | | | | | 703/2 |
| 2011/0029160 | A1 | * | 2/2011  | Pagliara ................. | F42B 10/66 |
| | | | | | 701/4 |
| 2012/0138729 | A1 | * | 6/2012  | Hindman ............. | G05D 1/0066 |
| | | | | | 244/3.21 |
| 2012/0175457 | A1 | * | 7/2012  | Hunter ..................... | F41A 1/02 |
| | | | | | 244/3.22 |

(Continued)

FOREIGN PATENT DOCUMENTS

JP    4-306500    10/1992

OTHER PUBLICATIONS

Neff, R., "Conical Nose Shape Effects on Drag and Static Stability at Mach 10", Feb. 1972, Journal of Spacecraft and Rockets, vol. 9, No. 2, p. 126-128.*

(Continued)

*Primary Examiner* — Jerrah Edwards
*Assistant Examiner* — Tamara Weber
(74) *Attorney, Agent, or Firm* — Wenderoth, Lind & Ponack, L.L.P.

(57) ABSTRACT

An aerial vehicle includes an outer surface, an arithmetic unit and a control unit. The arithmetic unit calculates a control command using a control parameter. The control unit controls an attitude of the aerial vehicle or a thrust of the aerial vehicle based on the control command. At least a part of the outer surface of the aerial vehicle is composed of ablation material. The arithmetic unit changes the control parameter in response to an amount of shape change of the aerial vehicle caused by disappearance of the ablation material.

15 Claims, 14 Drawing Sheets

(56) References Cited

U.S. PATENT DOCUMENTS

| | | | |
|---|---|---|---|
| 2013/0169293 A1* | 7/2013 | Lotito | G01S 13/08 |
| | | | 324/617 |
| 2014/0229139 A1* | 8/2014 | Hegenbart | G01P 5/001 |
| | | | 702/144 |
| 2015/0203215 A1* | 7/2015 | Falangas | B64F 5/00 |
| | | | 703/2 |

OTHER PUBLICATIONS

Neuringer, J., "Derivation of shape change equations for asymmetrically heated ablating reentry vehicles", Apr. 1973, International Journal of Engineering Science, vol. 11, Issue 4, p. 451-457.*
Rafinejad, D. and Derbidge, C., "Passive Nosetip Technology (PANT) Program", Dec. 1974, Acurex Corporation, vol. 17, p. 2-34 to 2-39.*
Armini, A. and Bunker, S., "A re-entry vehicle nosetip shape change sensor", May 1975, Proceedings of the Twenty-first International Instrumentation Symposium, Philadelphia, PA, p. 25-35.*
Morrison, A., "Effects of Nosetip Shape Change on Re-entry Vehicle Dispersion", Oct. 1975, Journal of Spacecraft and Rockets, vol. 12, No. 10, p. 633-635.*
Mohammadiun, H. and Mohammadiun, M., "Numerical Modeling of Charring Material Ablation with Considering Chemical-Reaction Effects, Mass Transfer and Surface Heat Transfer", published online Dec. 18, 2012, Arab J Sci Eng (2013) 38:2533-2543.*

\* cited by examiner

A-A CROSS-SECTIONAL VIEW

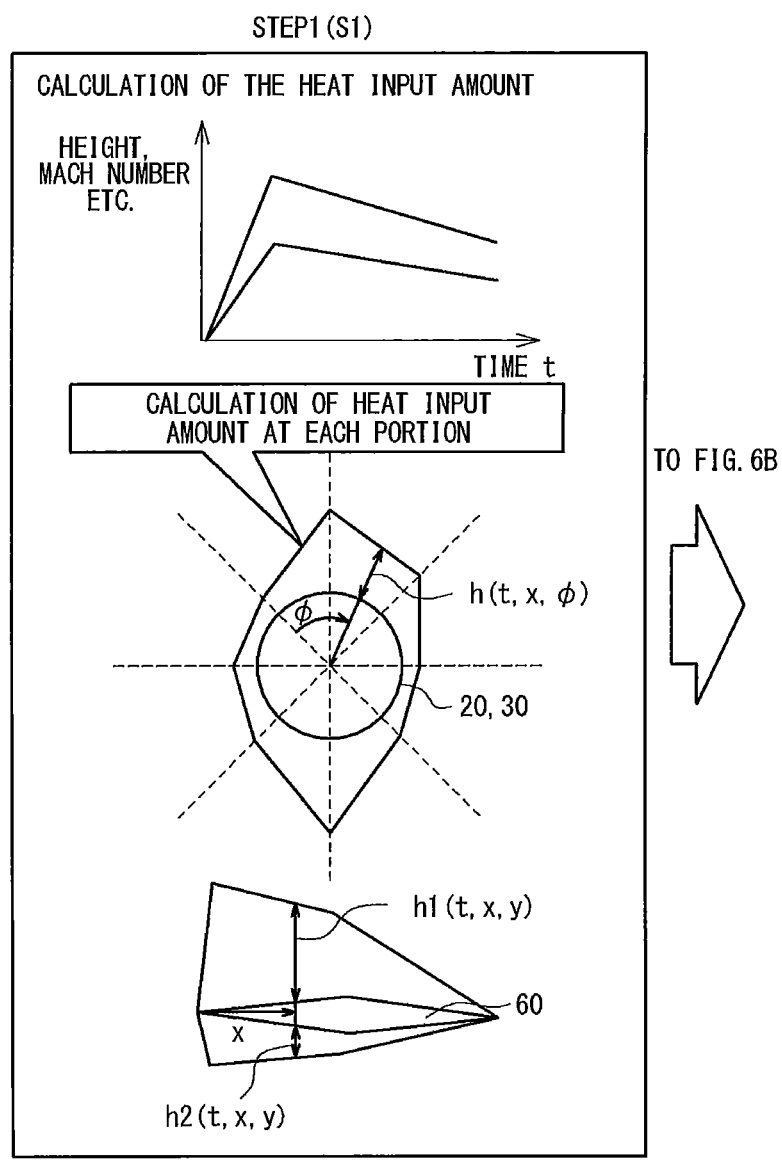

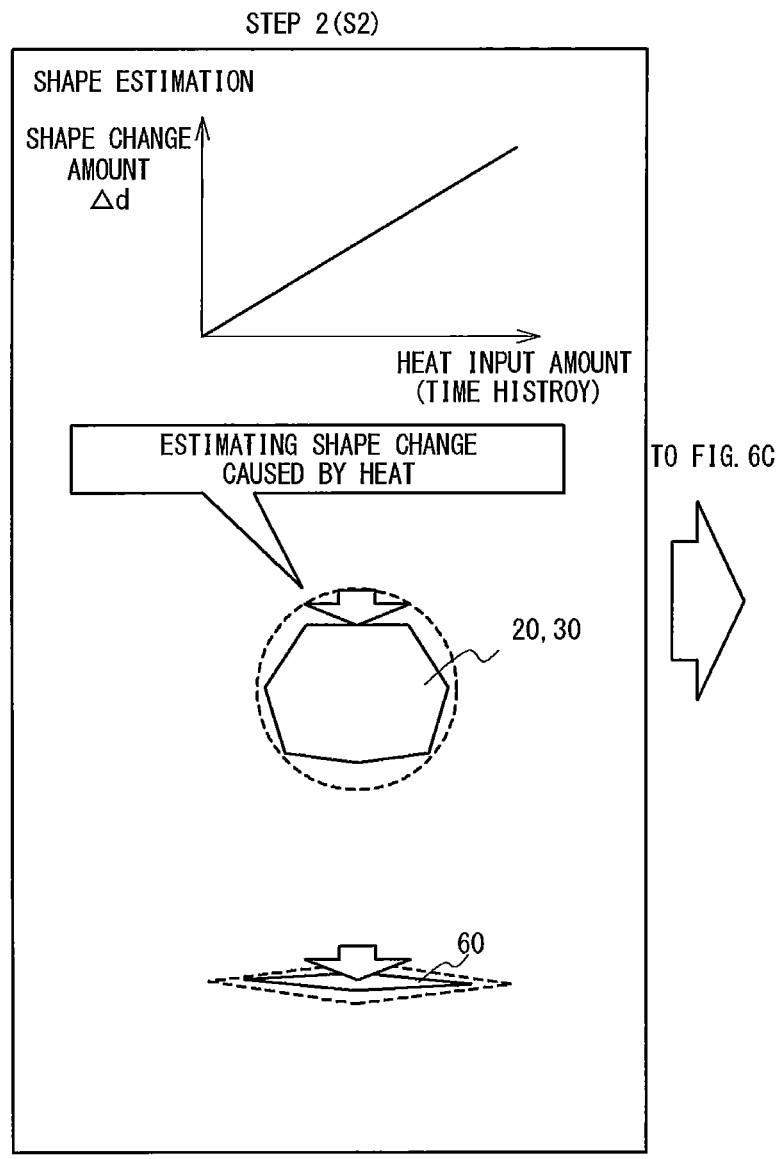

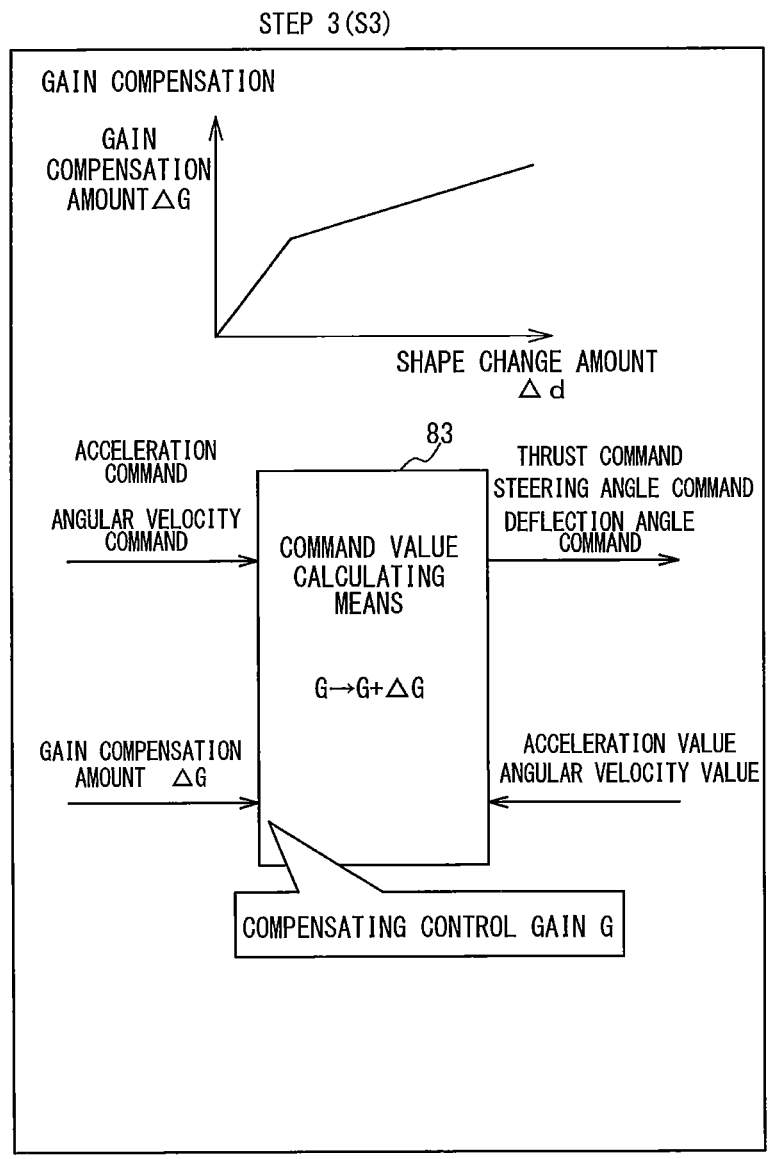

AERIAL VEHICLE AND OPERATING METHOD OF AERIAL VEHICLE

CROSS REFERENCE

This application claims priority from Japanese Patent Application No. 2014-74549 filed on Mar. 31, 2014, the disclosure of which is hereby incorporated by reference herein in its entirety.

TECHNICAL FIELD

The present invention relates to an aerial vehicle and an operation method of an aerial vehicle.

BACKGROUND ART

An aerial vehicle, such as a missile, tends to be sped up to reach a target point in a short period of time. In addition, a flying range of the aerial vehicle tends to be increased in order to be able to reach a target point farther away. Moreover, the aerial vehicle tends to be exposed to an environment of high aerodynamic heating as the speed of the aerial vehicle increases or the flying range of the aerial vehicle increases.

In order to adapt to the environment of high aerodynamic heating, a technology using heat resisting alloy for surfaces of the aerial vehicle 1 is known (FIG. 1). Note that the heat resisting alloy generally has high density. Therefore, in case of using the heat resisting alloy for the surfaces of the aerial vehicle, its weight becomes heavier.

Alternatively, a technology using ablation material for the surfaces of the aerial vehicle 1 is known (FIG. 2). Thereby, heat input from the environment to the aerial vehicle 1 is reduced as a result of melt of the ablation material. Note that a shape of the ablation material is changed as the ablation material disappears (as the ablation material wears, melts, etc.). Therefore, aerodynamic characteristics of the aerial vehicle changes as the shape of the ablation material changes when the ablation material is used as material of outer surfaces of the aerial vehicle.

JPH4-306500A discloses an aerial vehicle having a switching device which changes a value of control gain before a main propulsion device starts operation to another value of the control gain after the main propulsion device starts operation. However, a surface material of the aerial vehicle that is described in JPH4-306500A is unclear.

SUMMARY

An object of the present invention is to provide an aerial vehicle having an ablation material on its surface, which can change a control parameter in accordance with change of aerodynamic characteristics caused by disappearance (ware, melt, etc.) of the ablation material.

An aerial vehicle according to the present invention includes an outer surface, an arithmetic unit and a control unit. The arithmetic unit calculates a control command using a control parameter. The control unit controls an attitude of the aerial vehicle or a thrust of the aerial vehicle based on the control command. At least a part of the outer surface is composed of ablation material. The arithmetic unit changes the control parameter in response to an amount of shape change of the aerial vehicle caused by disappearance of the ablation material.

An operation method according to the present invention is an operation method of an aerial vehicle. The aerial vehicle includes an outer surface, an arithmetic unit and a control unit. The arithmetic unit calculates a control command using a control parameter. The control unit controls an attitude of the aerial vehicle or a thrust of the aerial vehicle based on the control command. At least a part of the outer surface is composed of ablation material. The method includes obtaining an amount of shape change of the aerial vehicle caused by disappearance of the ablation material, and changing the control parameter based on the amount of the shape change of the aerial vehicle.

According to the present invention, it is possible to provide the aerial vehicle having the ablation material on its surface, which can change the control parameter in accordance with the change of the aerodynamic characteristics caused by the disappearance (the ware, the melt, etc.) of the ablation material.

BRIEF DESCRIPTION OF THE DRAWINGS

The accompanying drawings are incorporated into the specification to assist in explaining some embodiments. The drawings are not to be construed as limiting the inventions to only those examples illustrated and described.

FIG. 6A is a schematic diagram for explaining a step of calculating a heat input;

FIG. 6B is a schematic diagram for explaining a step of estimating a shape (calculating an amount of shape change);

FIG. 6C is a schematic diagram for explaining a step of calculating an amount of gain compensation and applying the amount of the gain compensation.

DESCRIPTION OF EMBODIMENTS

Figure 1:
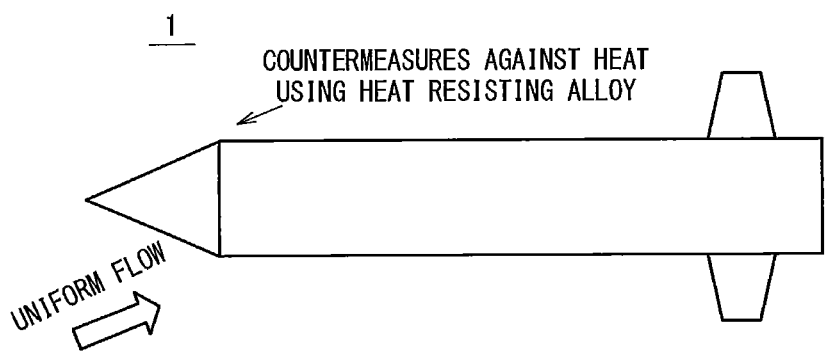
FIG. 1 is a schematic side view of an aerial vehicle according to prior arts.
Figure 2:
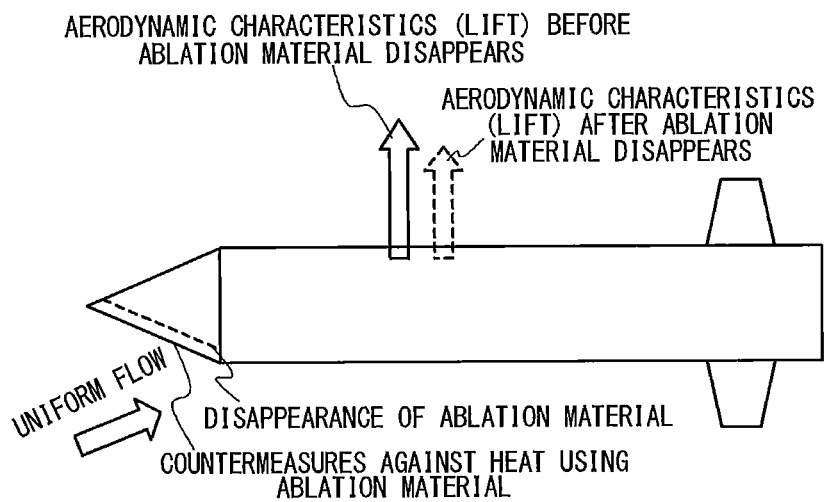
FIG. 2 is a schematic side view of an aerial vehicle according to prior arts.

Some embodiments will be described with reference to the attached drawings. In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

1. Definition of Terms

In this specification, "control parameter" means a parameter used for calculating a control command based on input data. The control parameter is not the input data itself. The control parameter is, for example, a gain, an operator such as Laplacian operator etc. The control parameter may be a calculation method itself in the case that there are some calculation methods (based on an analog circuit, a digital circuit, a program etc.) for calculating the control command based on the input data, and that one of the calculation methods is selected and used.

In this specification, "amount of shape change" means an amount of outer shape change of the aerial vehicle (or an amount of outer shape change of ablation material on a surface of the aerial vehicle) caused by disappearance (ware, melt, etc.) of the ablation material. Therefore, change of steering angle of a steering wing does not correspond to the outer shape change because the change of the steering angle is not the disappearance of the material.

2. Configuration of the Aerial Vehicle

Figure 3A:
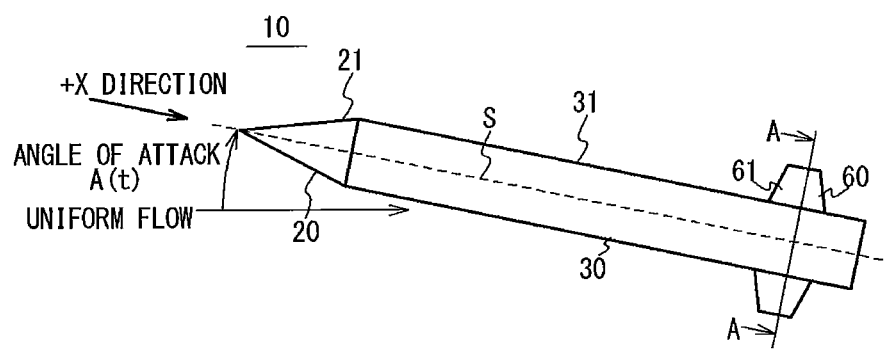
FIG. 3A is a schematic side view of an aerial vehicle according to some embodiments.
Figure 3B:
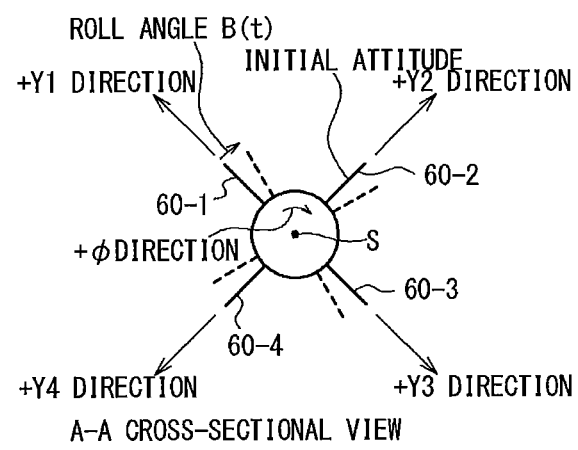
FIG. 3B is a cross-sectional view taken along line A-A when viewed from the direction indicated by the arrows.

FIG. 3A is a schematic side view of an aerial vehicle 10 according to some embodiments. FIG. 3B is a cross-sectional view taken along line A-A when viewed from the direction indicated by the arrows. At first, a coordinate system is defined. "X direction (X coordinate)" corresponds to a longitudinal direction of the aerial vehicle 10. "+X direction" corresponds to a backward direction of the aerial vehicle 10. On the other hand, "−X direction" corresponds to a forward direction of the aerial vehicle. "$\phi$ (Phi) direction ($\phi$ (Phi) coordinate)" corresponds to a rotational direction about a longitudinal axis S of the aerial vehicle 10. "+$\phi$ (+Phi) direction" corresponds to a clockwise direction viewed from +X direction. "Y1 direction (Y1 coordinate)" corresponds to a direction perpendicular to the X direction and a direction along a steering wing 60-1. Then, "+Y1 direction" corresponds to a direction away from the longitudinal axis S. Similarly, "Y2 direction (Y2 coordinate)", "Y3 direction (Y3 coordinate)" and "Y4 direction (Y4 coordinate)" correspond to directions perpendicular to the X direction and directions along a steering wing 60-2, a steering wing 60-3 and a steering wing 60-4, respectively. Note that when referring to an arbitrary one among Y1, Y2, Y3 and Y4, it is expressed as "Y". Note that when referring to an arbitrary one among the steering wing 60-1, the steering wing 60-2, the steering wing 60-3 and the steering wing 60-4, it is expressed as "60".

Next, an attitude angle of the aerial vehicle 10 is defined. An angle between a uniform flow and the longitudinal axis S of the aerial vehicle is defined as "angle of attack A(t)". Then, a rotation angle about the longitudinal axis S is defined as "roll angle B(t)". Note that "t" means time (for example, flight time). Namely, the angle of attack A(t) and the roll angle B(t) vary as the time passes. Note that "attitude angle" means the angle of attack and/or the roll angle.

As shown in FIGS. 3A and 3B, the aerial vehicle 10 includes a nose portion 20, a body portion 30, and the steering wings 60-1, 60-2, 60-3, 60-4. Moreover, the nose portion 20, the body portion 30 and the steering wing 60 include an outer surface 21 of the nose portion, an outer surface 31 of the body portion and an outer surface 61 of the steering wing, respectively. Then, at least a part of the outer surface (the outer surface 21, the outer surface 31 or the outer surface 61) is composed of ablation material. In particular, the outer surface of a portion exposed to the environment of high aerodynamic heating is preferably made of the ablative material. The outer surface of the portion exposed to the environment of high aerodynamic heating is, for example, the outer surface 21 of the nose portion or the outer surface 61 of the steering wing. On the other hand, the remainder of the outer surface of the aerial vehicle 10 may be made of material other than the ablation material. The material other than the ablation material is arbitrary. For example, heat resistant alloy can be used as the material other than the ablation material. A size or a specific shape etc. of the nose portion 20, the body portion 30 or the steering wing 60 is arbitrary regardless of the example shown in FIG. 3A and FIG. 3B. Then, the number of the steering wings is also arbitrary. Moreover, a type of the ablation material is arbitrary as long as a part of the material can disappear (melt, sublimate, ware out, deplete, be separated, be peeled, be burned out, etc.) during flight of the aerial vehicle 10. Note that the ablation material is preferably, a material to improve the heat resistance by endothermic reaction caused by phase change.

3. Control System

Figure 4:
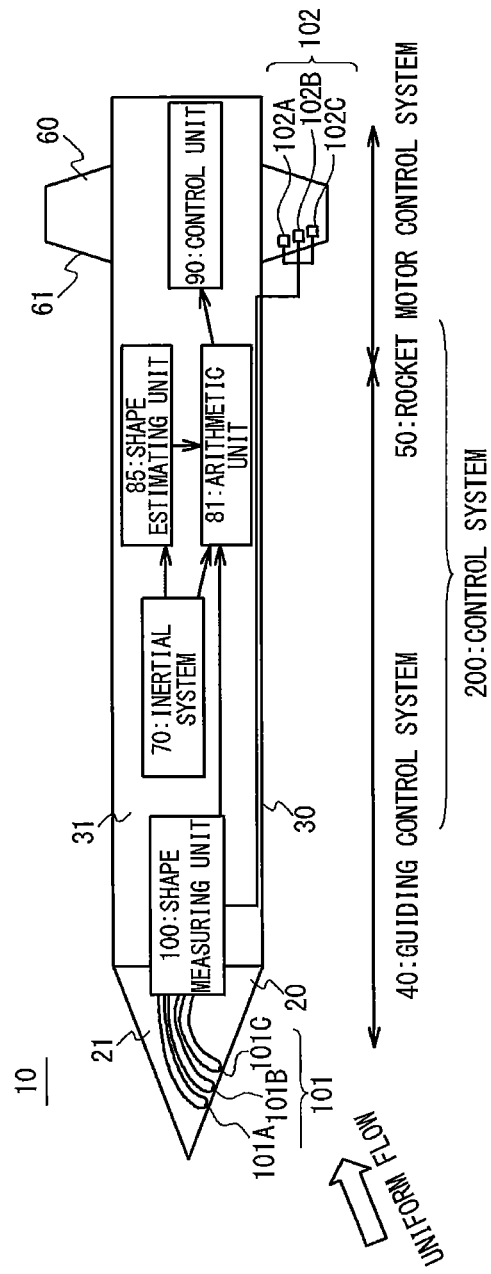
FIG. 4 is a functional block diagram indicating an example of a control system of the aerial vehicle according to some embodiments.

The aerial vehicle 10 of some embodiments is equipped with a control system 200 for controlling the steering wings, a propulsion device, etc. FIG. 4 is a functional block diagram indicating an example of the control system of the aerial vehicle according to some embodiments.

The control system 200 includes a guidance control system 40 and a rocket motor control system 50. The guiding control system 40 includes a shape measuring unit 100 (and/or a shape estimating unit 85, an inertial system 70, and an arithmetic unit 81. The shape measuring unit 100 includes sensor 101 or sensor 102 described later. The shape measuring unit 100 measures or calculates an amount of the shape change of the outer surface of the aerial vehicle 10 using the sensor 101 or the sensor 102. The inertial system 70 calculates data such as a position, altitude, Mach number, an angle of attack, a roll angle, acceleration, and an angular velocity based on signals from sensors (a GPS, an altitude sensor, a speed sensor, a gyro sensor, an acceleration sensor, etc.). The shape estimating unit 85 calculates an amount (estimated value) of the shape change of the outer surface of the aerial vehicle 10 based on the data obtained from the inertial system 70. The arithmetic unit 81 calculates the control command based on input data such as data from the inertial system 70. The control command is transmitted to a control unit 90 described later.

The calculation of the control command by the arithmetic unit 81 will be further explained. A control parameter such as a gain and a time constant is set or provided to the arithmetic unit 81 corresponding to a type of control method such as a PI control and a PID control. Then, the arithmetic unit 81 changes the control parameter in response to the amount of the shape change of the aerial vehicle inputted from the shape measuring unit 100 or the shape estimating unit 85. The arithmetic unit 81 calculates the control command using the changed control parameter, based on the inputted data.

The rocket motor control system 50 includes a control unit 90. The control unit 90 controls an attitude of the aerial vehicle 10 or a thrust of the aerial vehicle 10 based on the control command transmitted from the arithmetic unit 81.

Note that it is possible to calculate the shape change amount if the guiding control system 40 includes at least one the shape measuring unit 100 or the shape estimating unit 85. Therefore, one of the shape measuring unit 100 or the shape estimating unit 85 can be omitted. Alternatively, it is possible that the shape change amount of the outer surface, which corresponds to a position of the sensor 101 or the sensor 102, is calculated using the shape measuring unit 100 as well as the shape change amount of the outer surface, which corresponds to a position apart from the sensors 101, 102 is calculated using the shape estimating unit 85. Alternatively, it is possible that the shape change amount of the outer surface, which corresponds to the position of the sensor 101 or the sensor 102, is calculated using the shape measuring unit 100 and the shape change amount of the outer surface, which corresponds to a position away from the sensors 101, 102, is estimated by interpolation or extrapolation. In interpolating or extrapolating, the calculation result of the shape change amount estimated by the shape estimating unit 85 can be used.

In some embodiments, a plurality of thickness measuring sensors (such as ultrasonic sensors) 102A, 102B, 102C, which are disposed in the aerial vehicle, can be used as sensors 101, 102 used for measuring the shape change amount. By the thickness measuring sensors, the distance from each sensor to the outer surface is measured. Then, the shape change amount of the outer surface caused by the disappearance of the ablation material is calculated based on the measured distance.

In other embodiments, a plurality of temperature sensors (such as thermocouples) 101A, 101B, 101C, which are disposed in the aerial vehicle, can be used as sensors used for measuring the shape change amount. It is possible that the guidance control system 40 judges that the shape change amount (degree of the disappearance of the ablation material) of the outer surface, which corresponds to a position of the temperature sensor indicating a large amount of temperature increase among temperature sensors 101A, 101B and 101C, is large. In this case, the shape change of the outer surface is indirectly measured. Further, when the value indicated by the temperature sensor is changed discontinuously large, the guidance control system 40 can judge that base material under the ablation material, which corresponds to a position of the temperature sensor, is exposed to the environment as a result of the disappearance of the ablation material. In this case, the shape change of the outer surface is directly measured.

Note that in the case of measuring the shape change of the outer surface indirectly by temperature sensors, it is preferable to also use data of altitude, Mach number, angle of attack, roll angle, etc. obtained from the inertial system 70. For example, it is possible to estimate temperature of the outer surface corresponding to the temperature sensor, based on the data from the inertial system 70, and to estimate thickness between the temperature sensor 101 and the outer surface, based on the difference between the estimated temperature and the measured value by the temperature sensor 101.

According to some embodiments, the shape of the outer surface of the aerial vehicle 10 is changed because of the disappearance of the ablation material. As a consequence, aerodynamic characteristics of the aerial vehicle 10 are changed. However, according to these embodiments, the control parameter is changed based on the shape change amount of the outer surface of the aerial vehicle 10. As a result, it is possible to suppress deterioration of control characteristics of the aerial vehicle 10.

Figure 5:
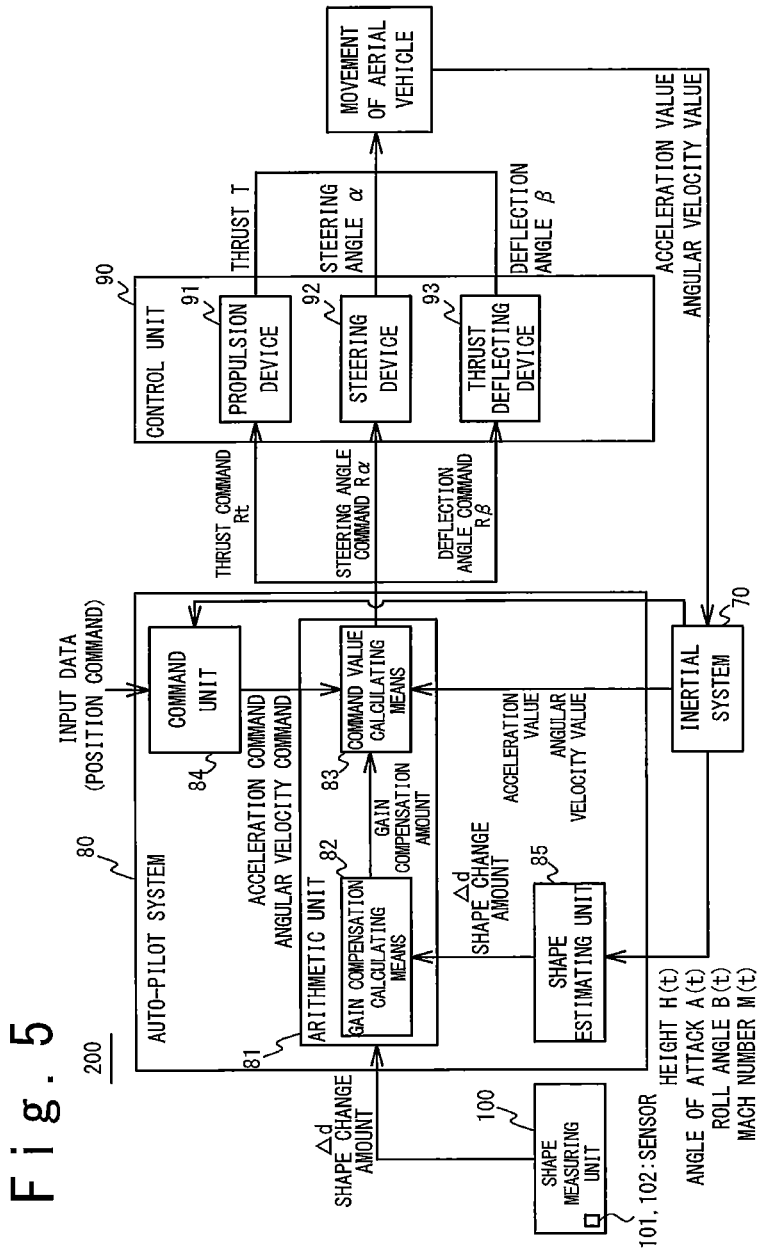
FIG. 5 is a diagram for explaining the block diagram described in FIG. 4 in more detail.

Referring to FIGS. 5 to 8, an example of the control system 200 will be described in more detail. FIG. 5 is a diagram for explaining the block diagram described in FIG. 4 in more detail.

(Shape Measuring Unit 100)

The shape measurement unit 100 may be constituted by a computer including a CPU and a storage device. The shape measuring unit 100 measures or estimates the shape change amount Δd of the outer surface of the aerial vehicle 10 based on signals (measured values) from the sensors 101, 102 such as temperature sensors or ultrasonic sensors. Then, the measured amount Δd or the estimated amount Δd is transmitted to a gain compensation calculating means (a control parameter changing means) of the arithmetic unit 81.

(Inertial System 70)

The inertial system 70 may be constituted by a computer including a CPU and a storage device. The inertial system 70 calculates flight parameters based on signals (measured values) from the sensors (the GPS, the altitude sensor, the speed sensor, the gyro sensor, the acceleration sensor, etc.). The flight parameters include the position, the altitude H(t), the Mach number M(t), the angle of attack A(t), the roll angle B(t), the acceleration, the angular velocity etc. of the aerial vehicle. The flight parameters vary as time t (for example, flight time) passes. The data such as the altitude H(t), the Mach number M(t), the angle of attack A(t) and the roll angle B(t) are transmitted from the inertial system 70 to the shape estimating unit 85. The data such as the acceleration and the angular velocity are transmitted from the inertial system 70 to a command value calculating means 83.

(Autopilot System 80)

The autopilot system 80 may be constituted by a computer including a CPU and a storage device. Note that at least two of the autopilot system 80, the inertial system 70, the shape measuring apparatus 100 and the control unit 90 may be constituted by one computer. The autopilot system 80 is a system for automatically steer the aerial vehicle 10. The autopilot system 80 has a function to calculate a control command (thrust command Rt, steering angle command Rα, deflection angle command Rβ, etc.) to be transmitted to the control unit 90 based on input data such as position command (e.g. target position data), or input data from the inertial system 70. To realize the function, the autopilot system 80 includes a command unit 84, the arithmetic unit 81, and the shape estimating unit 85. In the example described in FIG. 5, the autopilot system 80 functions as, for example, the command unit 84, the arithmetic unit 81 (a gain compensation calculating means and a command value calculating means) or the shape estimating unit 85 by executing a program stored in the storage device. Note that the autopilot system 80 may be replaced by a manual operation system. In this case, instead of the position command, or, in addition to the position command, command values corresponding to a pilot steering or command values from a remote control system are inputted to the arithmetic unit 81 etc.

(Command Unit 84)

The command unit 84 calculates input commands to be inputted to command value calculating means 83 based on the input data such as the position command and the input data (the position, the altitude, the Mach number, the angle of attack, the roll angle, the acceleration, the angular velocity etc. of the aerial vehicle 10) from the inertial system 70. The input command is, for example, an acceleration command or a target angular velocity command. The acceleration command and the angular velocity command are transmitted to the command value calculating means 83 of the arithmetic unit 81.

(Shape Estimating Unit 85)

The shape estimating unit 85 calculates the shape change amount Δd based on the data transmitted from the inertial system 70 as will be explained later with reference to FIGS. 8A and 9A. Then, the calculated shape change amount Δd is transmitted to the gain compensation calculating means (the control parameter changing means) 82 of the arithmetic unit 81.

Note that the shape estimating unit 85 may include an arithmetic unit. The arithmetic unit of the shape estimating unit 85 and arithmetic unit 81 explained later may be constituted by a single computing device (a single arithmetic unit). Alternatively, the arithmetic unit of the shape estimating unit 85 is an arithmetic unit different from the arithmetic unit 81 explained later.

(Gain Compensation Calculating Means 82 of the Arithmetic Unit 81)

The arithmetic unit 81 includes the gain compensation calculating means (the control parameter changing means) 82 and the command value calculating unit 83. The gain compensation calculating means (the control parameter changing means) 82 calculates a gain compensation amount (a command value for changing the control parameter) based on the shape change amount Δd transmitted from the shape measuring unit 100 and/or the shape estimating unit 85. The calculation of the gain compensation amount will be explained later with reference to FIGS. 8B and 9B. The calculated gain compensation amount (the command value for changing the control parameter) is transmitted to the command value calculating unit 83.

(Command Value Calculating Unit 83 of the Arithmetic Unit 81)

The command value calculating unit 83 calculates the control command (the thrust command Rt, the steering angle command Rα, the deflection angle command Rβ, etc.) to be transmitted to the control unit 90 based on the commands (the acceleration command, the angular velocity command etc.) transmitted from the command unit 84 and/or the input data (the acceleration data, the angular velocity data etc.) transmitted from the inertial system 70. The calculation is performed using the control parameter such as control gain. Further, the control gain (the control parameter) is changed based on the gain compensation amount (the command value for changing the control parameter) transmitted from the gain compensation calculating means 82.

(Control Unit 90)

The control unit 90 may be constituted by a computer including a CPU and a storage device. The control unit 90 controls the attitude and the thrust of the aerial vehicle 10 using a propulsion device 91, a steering device 92 or a thrust deflecting device 93. The propulsion device 91 is, for example, a rocket motor. The propulsion device 91 gives thrust T to the aerial vehicle 10. The steering device 92 changes a steering angle α of the steering wing 60. The thrust deflecting device 93 changes a direction of the exhaust jet of the combustion gas from the propulsion device 91, that is, to change a deflection angle β. The control device 90 determines the thrust T, the steering angle α, the deflection angle β etc. based on the command (the thrust command Rt, the steering angle command Rα, the deflection angle command Rβ, etc.) transmitted from the command value calculating unit 83.

Next, referring to FIGS. 6A to 7B, the flow for performing the gain compensation will be explained.

(Gain Compensating Flow: In Case of Using Shape Estimating Unit)

Firstly, the case in which the gain compensation is performed based on shape prediction by the shape estimating unit 85 will be explained. FIG. 6A is a schematic diagram for explaining a step of calculating a heat input. FIG. 6B is a schematic diagram for explaining a step of predicting the shape (calculating the amount of the shape change). FIG. 6C is a schematic diagram for explaining a step of calculating an amount of the gain compensation and applying the amount of the compensated gain.

The graph described in the upper side of FIG. 6A is a graph which schematically indicates that the altitude, the Mach number, etc. is changes as the time passes. The graph described in the middle of FIG. 6A is a graph which schematically indicates an amount h (t, x, φ) of heat input from the outer surface of the nose portion 20 or the body portion 30 of the aerial vehicle. Note that the amount h (t, x, φ) corresponds to an amount of the heat input from the outer surface at a position where the X-coordinate value is x and the φ-coordinate value is φ at the time t. The graph described in the lower side of FIG. 6A is a graph which schematically indicates an amount h1 (t, x, y) of heat input from the upper side outer surface of the steering wing 60 and an amount h2 (t, x, y) of heat input from the lower side outer surface of the steering wing 60. Note that the amount h1 (t, x, y) corresponds to an amount of the heat input from the upper side outer surface at a position where the X-coordinate value is x and the Y-coordinate value is y at the time t. Note that the amount h2 (t, x, y) corresponds to an amount of the heat input from the lower side outer surface at a position where the X-coordinate value is x and the Y-coordinate value is y at the time t.

In step 1 (S1), the shape estimating unit 85 calculates the amount of the heat input h (t, x, φ), the amount of the heat input h1 (t, x, y) and the amount of the heat input h2 (t, x, y) at each portion (at each location). After the calculation of the amount of the heat input is performed, it proceeds to step 2 (S2) described in FIG. 6B. Note that the details of the calculation of the amount of the heat input will be explained later with reference to FIGS. 8A and 9A.

The graph described in the upper side of FIG. 6B is a graph which schematically indicates a relationship between the time history of the heat input amount at each portion (e.g. an integrated value of the heat input amount) and the shape change amount Δd at the corresponding portion. The graph described in the middle of FIG. 6B is a graph which schematically indicates a prediction of the shape change of the nose portion 20 or the body portion 30. The solid line indicates the outer shape of the nose portion 20 or the body portion 30 before the shape changes, and the dashed line indicates the outer shape of the nose portion 20 or the body portion 30 after the shape changes. The graph described in the lower side of FIG. 6B is a graph which schematically indicates a prediction of the shape change of the steering wing 60. The solid line indicates the outer shape of the steering wing 60 before the shape changes, and the dashed line indicates the outer shape of the steering wing 60 after the shape changes. In step 2 (S2), the shape estimating unit 85 calculates the amount of the shape change Δd (Δd (x, φ), Δd1 (x, y), Δd2 (x, y)) at each portion based on the heat input amount h (t, x, φ), h1 (t, x, y), h2 (t, x, y) at the corresponding portion. After the calculation of the shape change amount is performed, it proceeds to step (S3) described in FIG. 6C. Note that the details of the calculation of the shape change amount will be explained later with reference to FIGS. 8A and 9A.

The graph described in the upper side of FIG. 6C is a graph which schematically indicates the relationship between the shape change amount Δd and the gain compensation amount ΔG. The graph described in the lower side of FIG. 6C is a graph which schematically indicates how the control gain G is replaced by the control gain G+ΔG in the command value calculating means 83 of the arithmetic unit 81. In step 3 (S3), the gain compensation calculating unit 82 of the arithmetic unit 81 calculates the gain compensation amount ΔG based on the shape change amount Δd (Δd (x, ϕ), Δd1 (x, y), Δd2 (x, y)) at each portion. Note that the details of the calculation of the gain compensation amount will be explained later with reference to FIGS. 8B and 9B.

The gain compensation amount ΔG obtained in Step 3 (S3) is transmitted to the command value calculating means 83 of the arithmetic unit 81. Then, the control gain G in the command value calculating means 83 is changed to the control gain G+ΔG. Then, the command value calculating means 83 calculates the thrust command Rt, the steering angle command Rα or the deflection angle command Rβ based on the input data (the acceleration command, the angular velocity command, and acceleration value, angular velocity value, etc. which are inputted from the inertial system 70), and the control parameters such as the control gain (the compensated control gain) G+ΔG. Note that the control gain G+ΔG is a control parameter which is applied to, for example, the difference between the acceleration command and the acceleration data inputted from the inertial system 70, or the difference between the angular velocity command and the angular velocity data inputted from the inertial system 70.

(Gain Compensating Flow: In Case of Using Shape Estimating Unit)

Figure 7:
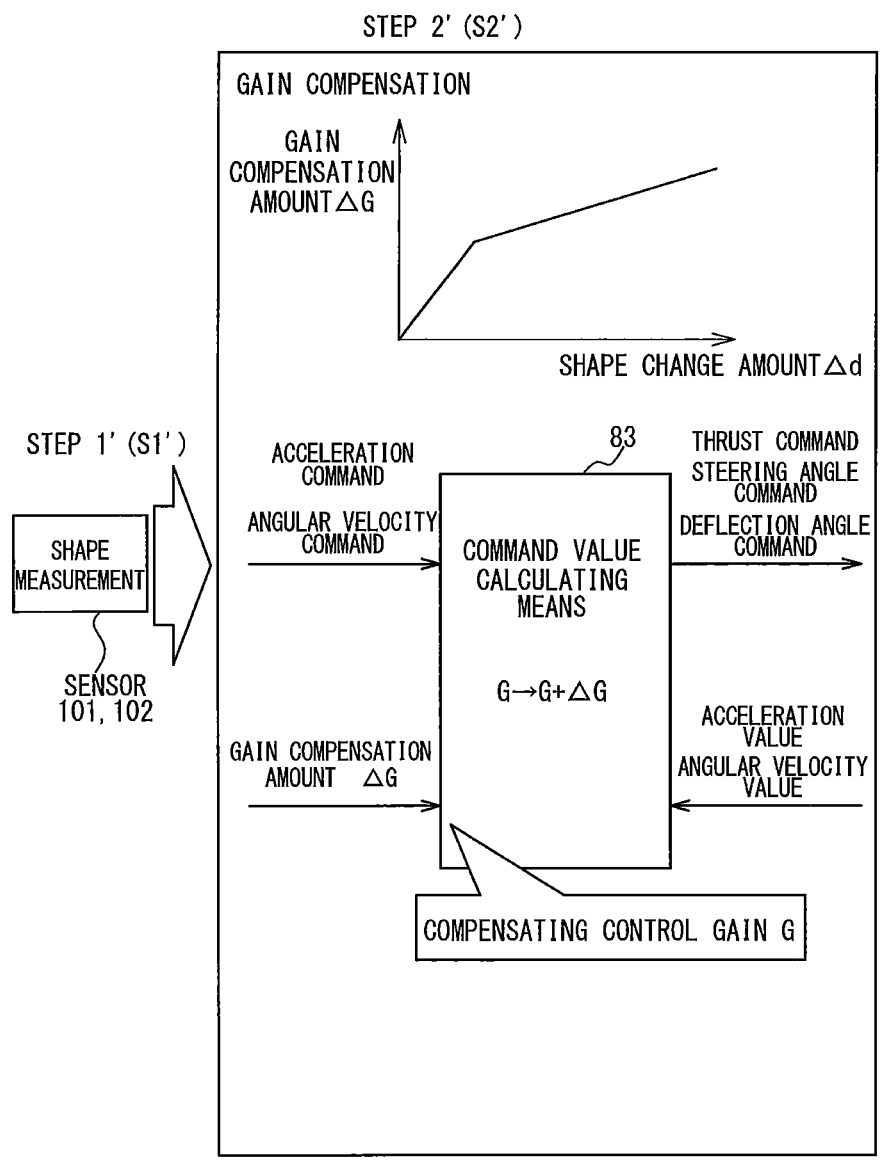
FIG. 7 is a schematic diagram for explaining an outline of the gain compensating flow.

Secondly, the case in which the gain compensation is performed based on shape measurement by the shape measuring unit 100 will be explained. FIG. 7 is a schematic diagram for explaining an outline of the gain compensating flow.

In Step 1' (S1'), the shape measuring unit 100 performs shape measurement using sensors 101, 102 and calculates the shape change amount Δd (Δd (x, ϕ), Δd1 (x, y), Δd2 (x, y)) at each portion.

Step 2' (S2') is the same as step 3 (S3) described above. That is, the gain compensation calculating unit 82 of the arithmetic unit 81 calculates the gain compensation amount ΔG based on the shape change amount Δd (Δd (x, ϕ), Δd1 (x, y), Δd2 (x, y)) at each portion. Then, the gain compensation amount ΔG calculated in Step 2' (S2') is transmitted to the command value calculating means 83 of the arithmetic unit 81. Then, the control gain G in the command value calculating means 83 is changed to the control gain G+ΔG. Then, the command value calculating means 83 calculates the thrust command Rt, the steering angle command Rα or the deflection angle command Rβ based on the input data (the acceleration command, the angular velocity command, and acceleration value, angular velocity value, etc. which are inputted from the inertial system 70), and the control parameters such as the control gain (the compensated control gain) G+ΔG. Note that the control gain G+ΔG is a control parameter which is applied to, for example, the difference between the acceleration command and the acceleration data inputted from the inertial system 70, or the difference between the angular velocity command and the angular velocity data inputted from the inertial system 70.

Next, referring to FIGS. 8A to 9B, the calculation of the shape change amount and the calculation of the gain compensation amount will be explained in more detail.

Firstly, referring to FIGS. 8A and 8B, the case of calculating the shape change amount of the nose portion 20 and calculating the gain compensation amount based on the shape change amount will be explained below.
(Calculation of the Shape Change Amount of the Nose Portion)

Figure 8A:
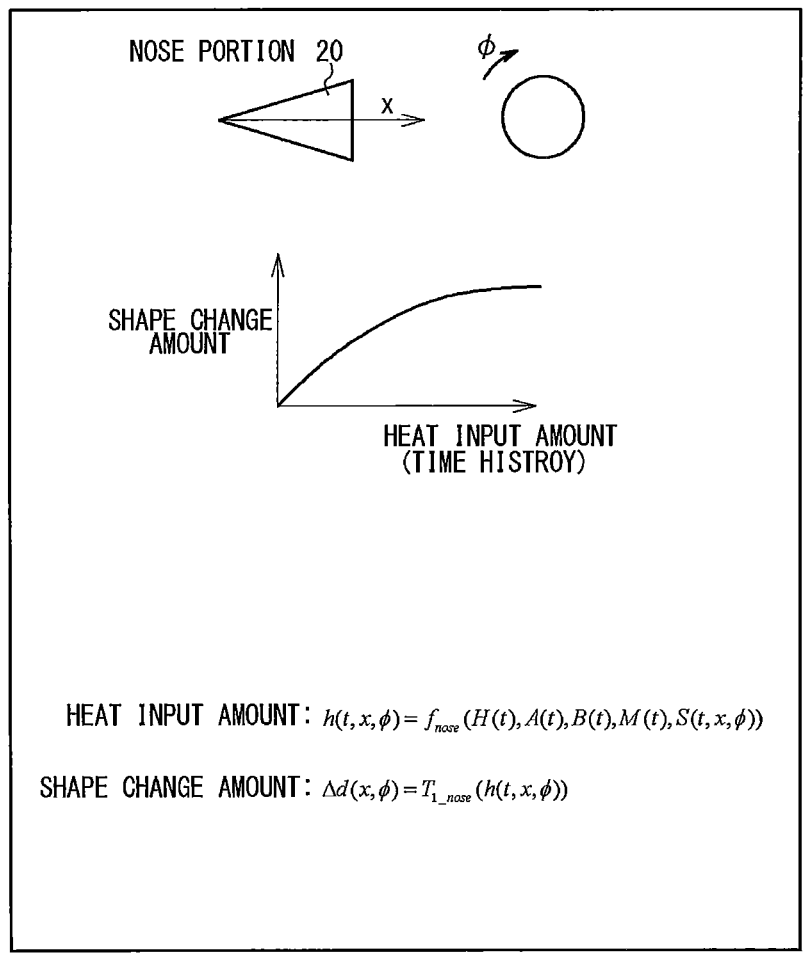
FIG. 8A is a schematic diagram for explaining an outline for calculating the amount of the shape change of a nose portion.

FIG. 8A is a schematic diagram for explaining an outline for calculating the amount of the shape change of the nose portion. The heat input amount h (t, x, ϕ) at each portion of the nose portion 20 is a function of the altitude H (t), the angle of attack A (t), the roll angle B (t), the Mach number M (t) and the shape data S (t, x, ϕ) as shown in the Formula (1) below.

$$h(t,x,\phi) = f_{nose}(H(t), A(t), B(t), M(t), S(t,x,\phi)) \quad (1)$$

The shape estimating unit 85 calculates the heat input amount h (t, x, ϕ) at each portion (at each location) based on the data (H (t), A (t), B (t), M (t)) transmitted from the inertial system 70 and the shape data S (t, x, ϕ) of the aerial vehicle. The calculation can be done by, for example, numerical calculation. The time history of the heat input amount h (t, x, ϕ) at each portion is stored in the storage device of the control system 200.

As indicated by the graph described in the middle of FIG. 8A, the shape change amount Δd (x, ϕ) at each portion (at each location) is a function of the time history (e.g., integrated value of the heat input amount) of the heat input amount h (t, x, ϕ). Thus, the relationship between the heat input amount h (t, x, ϕ) at each portion and the shape change amount Δd (x, ϕ) at the corresponding portion can be represented by the following Formula (2). Note that $T_{1\_nose}$ is a function or data table.

$$\Delta d(x,\phi) = T_{1\_nose}(h(t,x,\phi)) \quad (2)$$

The shape estimating unit 85 calculates the shape change amount Δd (x, ϕ) at each portion based on the time history of the heat input amount h (t, x, ϕ) stored in the storage device of the control system 200 and the $T_{1\_nose}$ stored in the storage device. The calculated shape change amount Δd (x, ϕ) is stored in the storage device of the control system 200. Note that the function or the data table for calculating the shape change amount Δd (x, ϕ) at each portion based on the heat input amount h (t, x, ϕ) at each portion can be acquired in advance using experimental data or numerical calculation. Note that a format of the data table for calculating the shape change amount Δd (x, ϕ) at each portion based on the heat input amount h (t, x, ϕ) at the corresponding portion is arbitrary as long as the data table can correlate between the heat input amount h (t, x, ϕ) at each portion and the shape change amount Δd (x, ϕ) at the corresponding portion. Then, the function or the data table is stored in the database of the control system 200 in advance.
(Calculation of the Gain Compensation Amount Based on the Shape Change Amount of the Nose Portion)

Figure 8B:
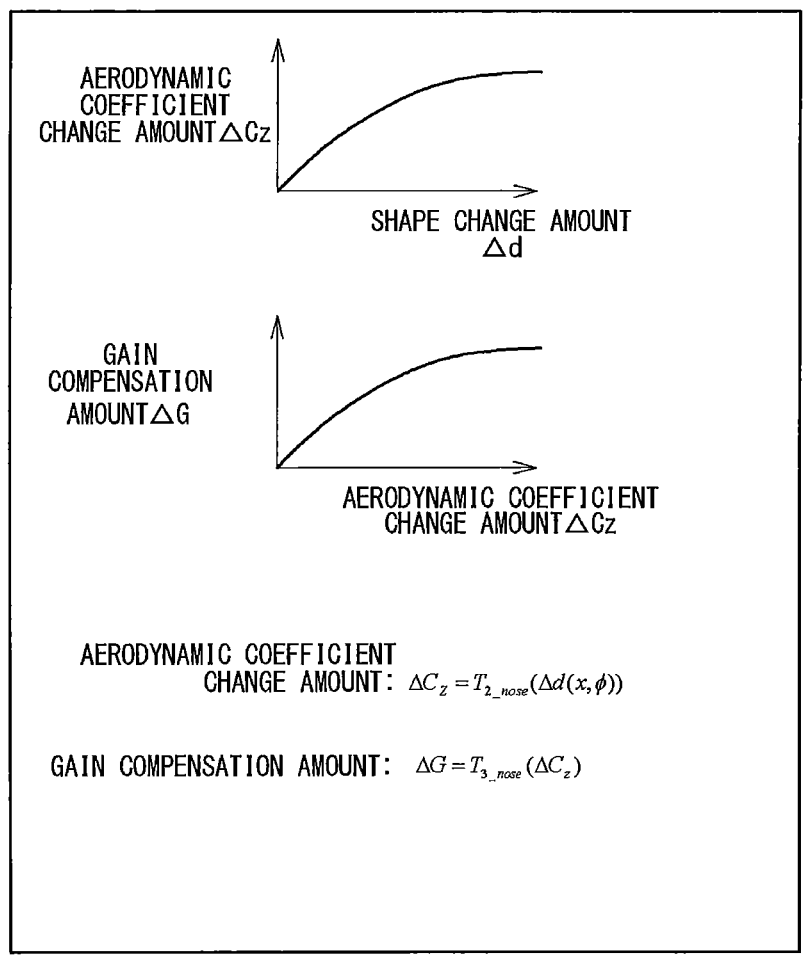
FIG. 8B is a schematic diagram for explaining an outline for calculating the amount of the gain compensation based on the shape change of the nose portion.

FIG. 8B is a schematic diagram for explaining an outline for calculating the amount of the gain compensation amount based on the shape change amount of the nose portion. As indicated by the graph described in the upper side of FIG. 8B, an amount of aerodynamic coefficient change ΔCz is a function of the shape change amount Δd (x, ϕ) at each portion. Thus, the relationship between the shape change amount Δd (x, ϕ) at the each portion and the aerodynamic coefficient change amount ΔCz can be represented by the following Formula (3). Note that $T_{2\_nose}$ is a function or data table.

$$\Delta Cz = T_{2\_nose}(\Delta d(x,\phi)) \quad (3)$$

The gain compensation calculating means 82 calculates the aerodynamic coefficient change amount ΔCz based on the shape change amount Δd (x, φ) stored in the storage device of the control system 200 and the $T_{2\_nose}$ stored in the storage device. The calculated aerodynamic coefficient change amount ΔCz is stored in the storage device of the control system 200. Note that the function or the data table for calculating the aerodynamic coefficient change amount ΔCz based on the shape change amount Δd (x, φ) at each portion can be acquired in advance using experimental data or numerical calculation. Note that a format of the data table for calculating the aerodynamic coefficient change amount ΔCz based on the shape change amount Δd at each portion is arbitrary as long as the data table can correlate between the shape change amount Δd at each portion and the aerodynamic coefficient change amount ΔCz. Then, the function or the data table is stored in the database of the control system 200 in advance.

As indicated by the graph described in the middle of FIG. 8B, the gain compensation amount ΔG is a function of the aerodynamic coefficient change ΔCz. Thus, the relationship between the aerodynamic coefficient change ΔCz and the gain compensation amount ΔG can be represented by the following Formula (4). Note that $T_{3\_nose}$ is a function or data table. By using $T_{3\_nose}$, it is possible to determine the optimum gain compensation amount ΔG corresponding to the aerodynamic coefficient change amount ΔCz.

$$\Delta G = T_{3\_nose}(\Delta Cz) \quad (4)$$

The gain compensation calculating means 82 calculates the gain compensation amount ΔG based on the aerodynamic coefficient change ΔCz stored in the storage device of the control system 200 and the $T_{3\_nose}$ stored in the storage device. The calculated gain compensation amount ΔG is stored in the storage device of the control system 200. Note that the function or the data table for calculating the gain compensation amount ΔG based on the aerodynamic coefficient change amount ΔCz can be acquired in advance using experimental data or numerical calculation. Note that a format of the data table for calculating the gain compensation amount ΔG based on the aerodynamic coefficient change ΔCz is arbitrary as long as the data table can correlate between the aerodynamic coefficient change ΔCz and the gain compensation amount ΔG. Then, the function or the data table is stored in the database of the control system 200 in advance.

In the above example, the gain compensation amount ΔG is calculated by applying the function or the data table $T_{2\_nose}$ and the function or the data table $T_{3\_nose}$ one by one (in other words, in two steps). However, the method of calculating the gain compensation amount ΔG is not limited to the examples. It is possible that $T_{2\_nose}$ and $T_{3\_nose}$ are combined as one function or combined data table in advance and that gain compensation amount ΔG can be calculated directly from the shape change amount Δd using the one function or the combined data table.

Next, referring to FIGS. 9A and 9B, the case of calculating the shape change amount of the steering wing 60 and calculating the gain compensation amount based on the shape change amount will be explained below.

(Calculation of the Shape Change Amount of the Steering Wing)

Figure 9A:
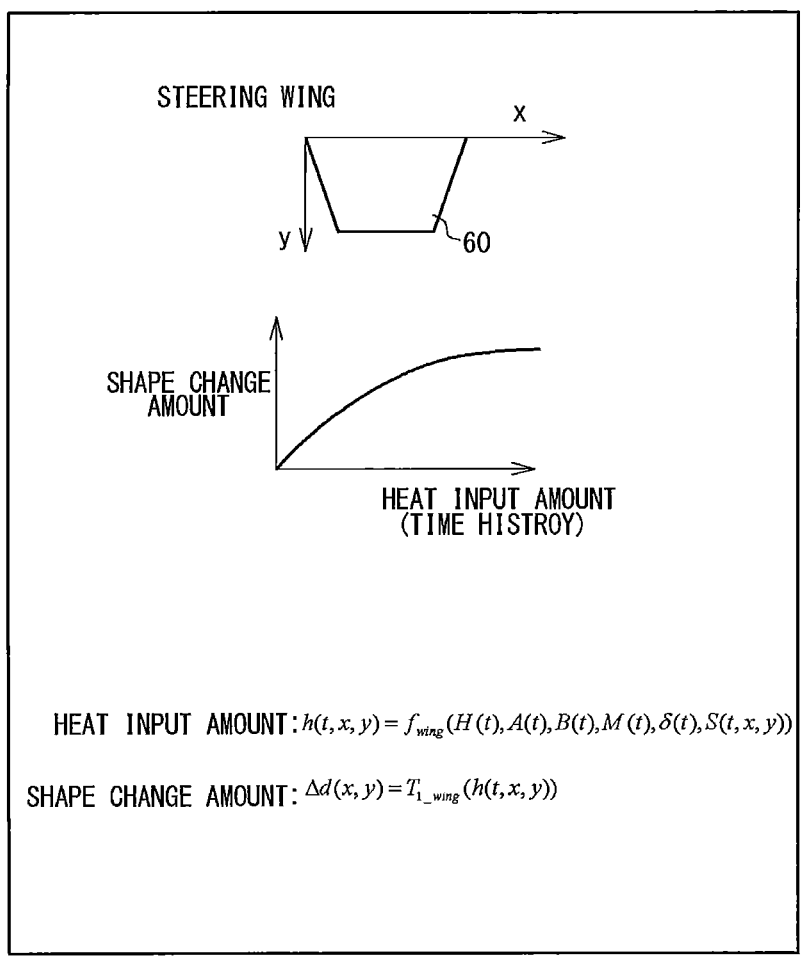
FIG. 9A is a schematic diagram for explaining an outline for calculating the amount of the shape change of a steering wing.

FIG. 9A is a schematic diagram for explaining an outline for calculating the amount of the shape change of the steering wing. The heat input amount h (t, x, y) at each portion (at each location) of the steering wing 60 is a function of the altitude H (t), the angle of attack A (t), the roll angle B (t), the Mach number M (t), the steering angle δ (t) and the shape data S (t, x, y) as shown in the Formula (5) below.

$$h(t,x,y) = f_{wing}(H(t), A(t), B(t), H(t), \delta(t), S(t,x,y)) \quad (5)$$

The shape estimating unit 85 calculates the heat input amount h (t, x, y) at each portion (at each location) based on the data (H (t), A (t), B (t), M (t)) transmitted from the inertial system 70, the steering angle δ (t) and the shape data S (t, x, y) of the aerial vehicle. The calculation can be done by, for example, numerical calculation. The time history of the heat input amount h (t, x, y) at each portion is stored in the storage device of the control system 200.

As indicated by the graph described in the middle of FIG. 9A, the shape change amount Δd (x, y) at each portion (at each location) is a function of the time history (e.g., integrated value of the heat input amount) of the heat input amount h (t, x, y). Thus, the relationship between the heat input amount h (t, x, y) at each portion and the shape change amount Δd (x, y) at the corresponding portion can be represented by the following Formula (6). Note that $T_{1\_wing}$ is a function or data table.

$$\Delta d(x,y) = T_{1\_wing}(h(t,x,y)) \quad (6)$$

The shape estimating unit 85 calculates the shape change amount Δd (x, y) at each portion based on the time history of the heat input amount h (t, x, y) stored in the storage device of the control system 200 and the $T_{1\_wing}$ stored in the storage device. The calculated shape change amount Δd (x, y) is stored in the storage device of the control system 200. Note that the function or the data table for calculating the shape change amount Δd (x, y) at each portion based on the heat input amount h (t, x, y) at the corresponding portion can be acquired in advance using experimental data or numerical calculation. Note that a format of the data table for calculating the shape change amount Δd (x, y) at each portion based on the heat input amount h (t, x, y) at the corresponding portion is arbitrary as long as the data table can correlate between the heat input amount h (t, x, y) at each portion and the shape change amount Δd (x, y) at the corresponding portion. Then, the function or the data table is stored in the database of the control system 200 in advance.

(Calculation of the Gain Compensation Amount Based on the Shape Change Amount of the Steering Wing)

Figure 9B:
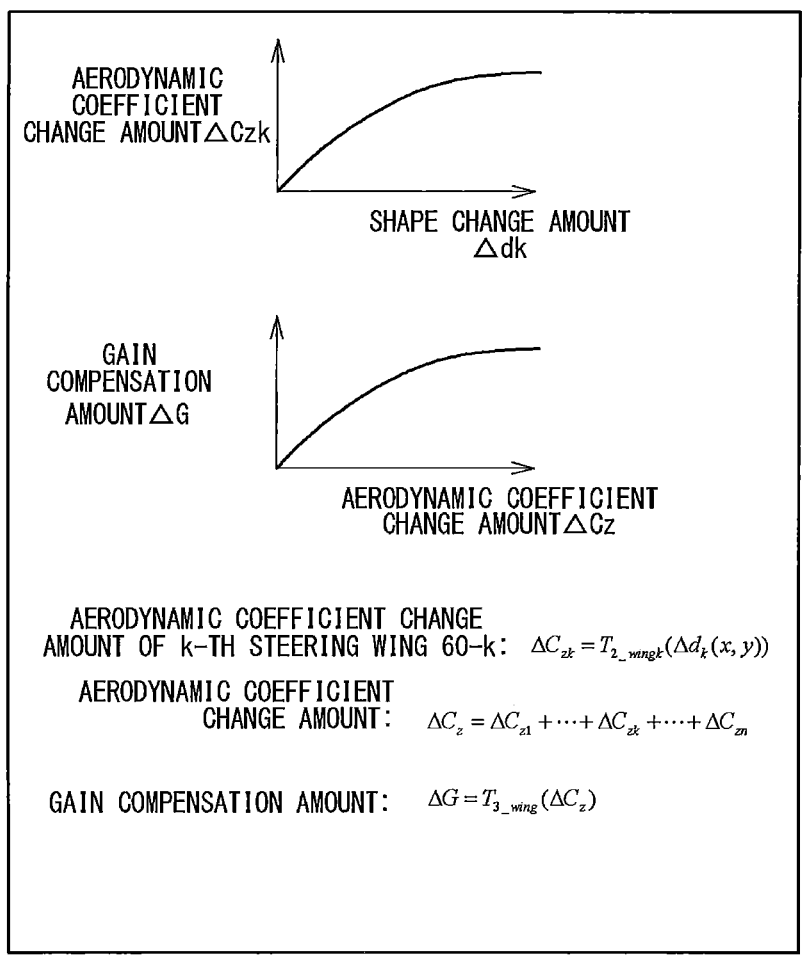
FIG. 9B is a schematic diagram for explaining an outline for calculating the amount of the gain compensation based on the shape change of the steering wing.

FIG. 9B is a schematic diagram for explaining an outline for calculating the amount of the gain compensation amount based on the shape change amount of the steering wing. As indicated by the graph described in the upper side of FIG. 9B, an amount of aerodynamic coefficient change amount $\Delta Cz_k$ of the k-th steering wing 60-k is a function of the shape change amount $\Delta d_k$ (x, y) at each portion of the steering wing 60-k. Thus, the relationship between the shape change amount $\Delta d_k$ (x, y) at each portion and the aerodynamic coefficient change amount $\Delta Cz_k$ can be represented by the following Formula (7). Note that $T_{2\_wingk}$ is a function or data table.

$$\Delta Cz_k = T_{2\_wingk}(\Delta d_k(x,y)) \quad (7)$$

The gain compensation calculating means 82 calculates the aerodynamic coefficient change amount $\Delta Cz_k$ based on the shape change amount $\Delta d_k$ (x, y) stored in the storage device of the control system 200 and the $T_{2\_wingk}$ stored in the storage device. The calculated aerodynamic coefficient change amount $\Delta Cz_k$ is stored in the storage device of the control system 200. Note that the function or the data table for calculating the aerodynamic coefficient change amount $\Delta Cz_k$ based on the shape change amount $\Delta d_k$ (x, y) at each portion can be acquired in advance using experimental data or numerical calculation. Note that a format of the data table for calculating the aerodynamic coefficient change amount $\Delta Cz_k$ based on the shape change amount $\Delta d_k$ at each portion is arbitrary as long as the data table can correlate between the shape change amount $\Delta d_k$ at each portion and the aerodynamic coefficient change amount $\Delta Cz_k$. Then, the function or the data table is stored in the database of the control system 200 in advance.

Then, the aerodynamic coefficient change amount $\Delta Cz$ as the aerodynamic coefficient change amount of the whole of the steering wing 60 is obtained by the sum of the aerodynamic coefficient change amount $\Delta Cz_k$ of each steering wing 60-$k$ (Formula (8)). The aerodynamic coefficient change amount $\Delta Cz$ is stored in the storage device of the control system 200.

$$\Delta Cz = \Delta Cz_1 + \ldots + \Delta Cz_k + \ldots + \Delta Cz_n \qquad (8)$$

As indicated by the graph described in the middle of FIG. 9B, the gain compensation amount $\Delta G$ is a function of the aerodynamic coefficient change amount $\Delta Cz$. Thus, the relationship between the aerodynamic coefficient change amount $\Delta Cz$ and the gain compensation amount $\Delta G$ can be represented by the following Formula (9). Note that $T_{3\_wing}$ is a function or data table. By using $T_{3\_wing}$, it is possible to determine the optimum gain compensation amount $\Delta G$ corresponding to the aerodynamic coefficient change amount $\Delta Cz$.

$$\Delta G = T_{3\_wing}(\Delta Cz) \qquad (9)$$

The gain compensation calculating means 82 calculates the gain compensation amount $\Delta G$ based on the aerodynamic coefficient change $\Delta Cz$ stored in the storage device of the control system 200 and the $T_{3\_wing}$ stored in the storage device. The calculated gain compensation amount $\Delta G$ is stored in the storage device of the control system 200. Note that the function or the data table for calculating the gain compensation amount $\Delta G$ based on the aerodynamic coefficient change amount $\Delta Cz$ can be acquired in advance using experimental data or numerical calculation. Note that a format of the data table for calculating the gain compensation amount $\Delta G$ based on the aerodynamic coefficient change amount $\Delta Cz$ is arbitrary as long as the data table can correlate between the aerodynamic coefficient change amount $\Delta Cz$ and the gain compensation amount $\Delta G$. Then, the function or the data table is stored in the database of the control system 200 in advance.

In the above example, the gain compensation amount $\Delta G$ is calculated by applying the function or the data table $T_{2\_wingk}$ and the function or the data table $T_{3\_wing}$ one by one (in other words, in two steps). However, the method of calculating the gain compensation amount $\Delta G$ is not limited to the examples. It is possible that $T_{2\_wingk}$ and $T_{3\_wing}$ are combined as one function or combined data table in advance and that the gain compensation amount $\Delta G$ can be calculated directly from the shape change amount $\Delta d$ using the one function or the combined data table.

(Function or Data Table for Calculating the Shape Change Amount)

The function $f_{nose}$ and the function $f_{wing}$ are functions for calculating the shape change amount $\Delta d$. Therefore, each of the function $f_{nose}$ and the function $f_{wing}$ can be referred to as a shape change amount calculation function. The data table $T_{1\_nose}$ and the data table $T_{1\_wing}$ are data tables for calculating the shape change amount $\Delta d$. Therefore, each of the data table $T_{1\_nose}$ and the data table $T_{1\_wing}$ can be referred to as a shape change amount calculation table.

(Alternative Embodiment 1 for Calculating the Shape Change Amount)

In the above example, the altitude H (t), the angle of attack A (t), the roll angle B (t), the Mach number M (t) and the shape data S (t, x, $\phi$) are used for calculating the shape change amount $\Delta d$ (x, $\phi$). In addition, the altitude H (t), the angle of attack A (t), the roll angle B (t), the Mach number M (t), the steering angle $\delta$ (t) and the shape data S (t, x, y) are used for calculating the shape change amount $\Delta d$ (x, y).

However, embodiments are not limited to the above example. It is possible to use time only to approximately calculate the shape change amount $\Delta d$ at each portion. For example, it is supposed that the amount of disappearance of the ablation material at each portion (at each location) can be assumed approximately constant per time. Alternatively, it is supposed that the Mach number of the flight, the flight path (flight altitude) and the flight attitude can be determined in advance. Further alternatively, it is supposed that the Mach number of the flight, the flight path (flight altitude) and the flight attitude can be approximately estimated in accordance with operational policy or characteristics of the aerial vehicle 10. In these cases, the shape change amount $\Delta d$ at each portion can be said to be approximately a function of time only. Therefore, in these cases, a shape change amount calculation function or a shape change amount calculation table, which outputs the shape change amount $\Delta d$ as output data when time as input data is inputted, can be used.

(Modified Alternative Embodiment 1 for Calculating the Shape Change Amount)

In the alternative embodiment 1 described above, the shape change amount calculation function or the shape change amount calculation table is a function or a table which correlates the shape change amount with the time. In this case, it is possible to calculate the shape change amount $\Delta d$ at each time in advance using the shape change amount calculation function or the shape change amount calculation table. Moreover, it is possible to calculate the gain compensation amount $\Delta G$ at each time in advance using the function or the data table ($T_{2\_nose}$, $T_{3\_nose}$, $T_{2\_wingk}$, $T_{3\_wing}$).

In the modified alternative embodiment 1, the point that the shape change amount calculation function or the shape change amount calculation table can be obtained in advance is used. That is, according to the modified alternative embodiment 1, the arithmetic unit 81 is preprogrammed in advance such that the arithmetic unit 81 applies (adds) the gain compensation amount $\Delta G$, which is acquired in advance, to the gain at each time. In this case, the arithmetic unit 81 changes the control gain G (the control parameter) in accordance with the shape change amount $\Delta d$ based on the pre-program. Note that in case of changing the control gain G (the control parameter) using the pre-program, it is possible to omit the shape measuring apparatus 100 and the shape estimating unit 85. Therefore, it is possible to reduce the cost of the aerial vehicle 10.

(Alternative Embodiment 2 for Calculating the Shape Change Amount)

Alternatively, it is possible to use time and altitude to approximately calculate the shape change amount $\Delta d$ at each portion. It is supposed that the Mach number of the flight and the flight attitude can be approximately estimated in accordance with the operational policy or characteristics of the aerial vehicle 10. In this case, the shape change amount $\Delta d$ at each portion can be said to be approximately a function of the time and the altitude. Therefore, in this case, a shape change amount calculation function or a shape change amount calculation table, which outputs the shape change amount Δd as output data when time and altitude as input data are inputted, can be used.

(Alternative Embodiment 3 for Calculating the Shape Change Amount)

Alternatively, it is possible to use time and Mach number to approximately calculate the shape change amount Δd at each portion. It is supposed that the flight altitude and the flight attitude can be approximately estimated in accordance with the operational policy or characteristics of the aerial vehicle 10. In this case, the shape change amount Δd at each portion can be said to be approximately a function of the time and the Mach number. Therefore, in this case, a shape change amount calculation function or a shape change amount calculation table, which outputs the shape change amount Δd as output data when time and Mach number as input data are inputted, can be used.

(Alternative Embodiment 4 for Calculating the Shape Change Amount)

Alternatively, it is possible to use time and attitude (an angle of attack and/or a roll angle) to approximately calculate the shape change amount Δd at each portion. It is supposed that the flight Mach number and the flight altitude can be approximately estimated in accordance with the operational policy or characteristics of the aerial vehicle 10. In this case, the shape change amount Δd at each portion can be said to be approximately a function of the time and the attitude angle. Therefore, in this case, a shape change amount calculation function or a shape change amount calculation table, which outputs the shape change amount Δd as output data when time and an attitude angle as input data are inputted, can be used.

(Combination of the Alternative Embodiment 1 and the Alternative Embodiment 4)

The alternative embodiment 1 and the alternative embodiment 4 can be combined arbitrarily. For example, in order to approximately calculate the shape change amount Δd at each portion, the time, the altitude and the Mach number can be used.

(Alternative Embodiment for Calculating Heat Input Amount)

In the above embodiments, heat input amount (h (t, x, φ) or h (t, x, y)) is calculated by numerical calculation. However, it is not limited to the above embodiments. For example, it is possible to estimate the heat input amount at each portion based on the data from the above mentioned temperature sensor 101.

(Alternative Embodiment for Gain Compensation)

In the above embodiments, the gain compensation is performed by adding (or subtracting) the gain compensation amount ΔG to (or from) the standard control gain G. However, it is not limited to the above embodiments. For example, it is possible to perform the gain compensation by multiplying or dividing the standard control gain G. As an example of the multiplication and the division, it is possible to multiplying the standard control gain G by the coefficients K.

4. Operation Method

Figure 10:
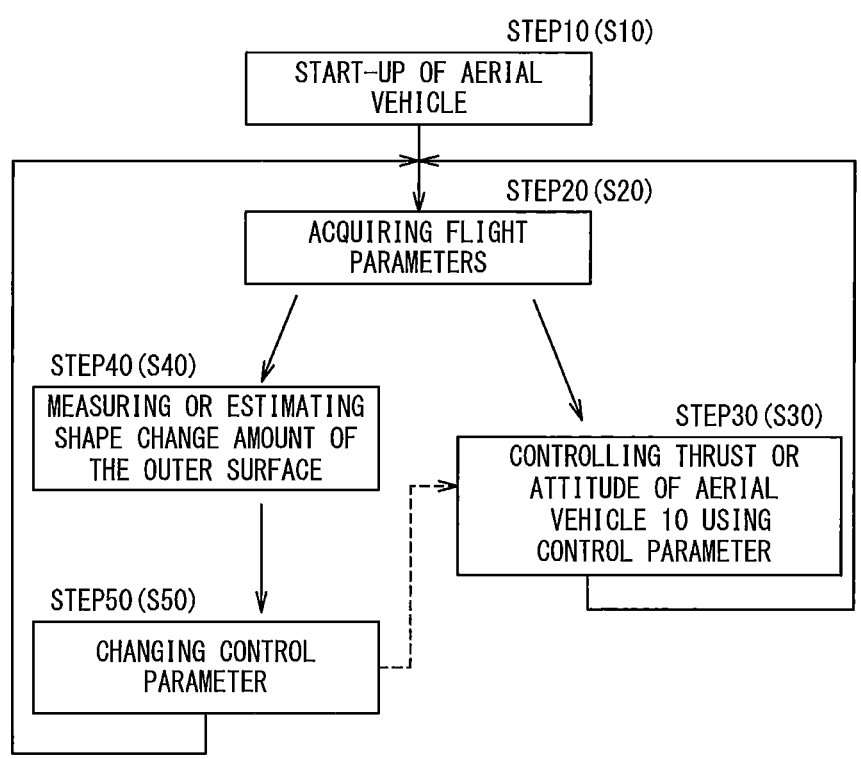
FIG. 10 is a flow chart for explaining an outline of an operation method of the aerial vehicle.

FIG. 10 is a flow chart for explaining an outline of an operation method of the aerial vehicle 10.

In step 10 (S10), the rocket motor of the aerial vehicle 10 is ignited, and the aerial vehicle 10 starts flying.

In step 20 (S20), the inertial system 70, calculates the flight parameters (the position, the altitude, the Mach number, the angle of attack, the roll angle, the acceleration, the angular velocity, etc. of the aerial vehicle). After the execution of step 20 (S20), it proceeds to step 30 (S30) and step (S40).

In step 30 (S30), the command value calculating means of the control system 200 calculates the control command value using the flight parameters and/or the input commands, etc. as the input data and the control parameter. As shown in FIG. 6C, the flight parameters are, for example, acceleration, an angular velocity and the like. The input commands are, for example, an acceleration command, an angular velocity command and the like. The control parameter is, for example, a control gain G and the like. Then, the control command is, for example, a thrust command, a steering angle command, a deflection angle command and the like. The control unit 90 controls the thrust or the attitude of the aerial vehicle 10 based on the thrust command, the steering angle command, the deflection angle command, etc. After the execution of step 30 (S30), it returns to step 20 (S20).

In step 40 (S40), the shape measuring unit 100 and/or the shape estimating unit 85 performs the measurement or calculation of the shape change amount of the outer surface of the aerial vehicle 10. A part of the ablation material of the outer surface disappears (ware out, deplete, melt etc.) as the aerial vehicle 10 flies at a high speed. For this reason, the outer surface shape of the aerial vehicle 10 changes.

In step 50 (S50), the gain compensation calculating means (the control parameter changing means) 82, calculates the compensation amount of the control parameter (the gain compensation amount and the like) based on the shape change amount. The compensation amount of the control parameter (the gain compensation amount and the like) is transmitted to the command value calculating means 83. The command value calculating means 83 changes the control parameter (the control gain and the like) based on the compensation amount of the control parameter (the gain compensation amount and the like). The next time step (S30) is executed, the changed control parameter (compensated control gain G+ΔG, etc.) is applied. After the execution of step 50 (S50), it returns to step 20 (S20).

In this embodiment, aerodynamic characteristics of the aerial vehicle 10 are changed in accordance with the disappearance of the ablation material. However, in this embodiment, the control parameter can be changed to a control parameter suitable for the changed aerodynamics, because the method (this embodiment) includes the step 40 (S40) and the step 50 (S50). As a consequence, it is possible to suppress deterioration of control characteristics of the aerial vehicle.

5. Attitude Control Mechanism (Alternative Embodiment 1 of the Attitude Control Mechanism)

In some embodiments described above, the steering wing 60 and/or the thrust deflecting device is used as the attitude control mechanism. However, it is not limited to the above embodiments. For example, it is possible to use an auxiliary nozzle, which exhausts gas jet toward a direction different from the direction of the longitudinal axis S of the aerial vehicle in order to control the attitude of the aerial vehicle.

(Alternative Embodiment 2 of the Attitude Control Mechanism)

Figure 11:
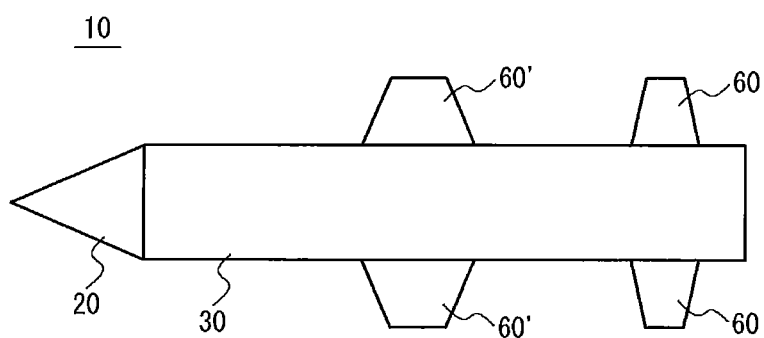
FIG. 11 is a schematic side view of an aerial vehicle which has a plurality of steering wings along a direction parallel to a longitudinal direction of the aerial vehicle according to alternative embodiments.

In some embodiments described above, a plurality of the steering wings 60-1, 60-2, 60-3, 60-4 is provided. However, it is not limited to the above embodiments. The number of the steering wings 60 is arbitrary. In addition, as shown in FIG. 11, the aerial vehicle may include a plurality of the steering wings 60, 60' along a direction parallel to the longitudinal axis S of the aerial vehicle. Moreover, one of the steering wing 60 and the steering wing 60' may be replaced by an auxiliary nozzle for exhausting gas jet.

6. Type of Aerial Vehicle

In some embodiments, the type of the aerial vehicle is arbitrary. The aerial vehicle may be, for example, an aerial vehicle which flies toward a target and destroys the target (in other words, an aerial vehicle is a missile). Moreover, the aerial vehicle may be an unmanned aerial vehicle or may be a manned aerial vehicle. In addition, the aerial vehicle may be an aerial vehicle flying in the atmosphere or may be an aerial vehicle that enters the atmosphere from outer space.

As mentioned above, the present invention has been described by referring to embodiments. However, the present invention is not limited to the above mentioned embodiments. Various modifications can be performed on the above mentioned embodiments. Moreover, various techniques used in some embodiments or alternatives can be applicable to other embodiments or alternatives as long as the technical contradiction does not occur.

What is claimed is:

1. An aerial vehicle comprising:
an outer surface;
at least one processor; and
at least one non-transitory memory having stored thereon executable instructions, which when executed by the at least one processor, cause the aerial vehicle to function as an arithmetic unit configured to calculate a control command using a control parameter and a control unit configured to control an attitude of the aerial vehicle or a thrust of the aerial vehicle based on the control command,
wherein at least a part of the outer surface is composed of ablation material,
wherein the arithmetic unit is configured to change the control parameter in response to an amount of a shape change of the aerial vehicle caused by disappearance of the ablation material,
wherein the control parameter includes a control gain,
wherein the arithmetic unit is configured to calculate an amount of an aerodynamic coefficient change based on the amount of the shape change and a calculation function or a calculation table which correlates the amount of the shape change with the amount of the aerodynamic coefficient change,
wherein the arithmetic unit is configured to calculate a gain compensation amount based on the amount of the aerodynamic coefficient change and a calculation function or a calculation table which correlates the aerodynamic coefficient change with the gain compensation amount, and
wherein the arithmetic unit is configured to change the control gain based on the gain compensation amount.

2. The aerial vehicle according to claim 1, wherein:
the executable instructions, which when executed by the at least one processor, cause the aerial vehicle to further function as an inertial system configured to obtain flight parameters of the aerial vehicle,
wherein the arithmetic unit is configured to calculate the control command using the flight parameters and the control parameter.

3. The aerial vehicle according to claim 2, wherein:
the executable instructions, which when executed by the at least one processor, cause the aerial vehicle to further function as a command unit configured to transmit input commands to the arithmetic unit,
wherein the arithmetic unit is configured to calculate the control command using the input commands, the flight parameters and the control parameter.

4. The aerial vehicle according to claim 3, wherein the control gain is to be applied to a difference between the input commands and the flight parameters.

5. The aerial vehicle according to claim 3, wherein:
the executable instructions, which when executed by the at least one processor, cause the aerial vehicle to further function as an autopilot system,
wherein the autopilot system includes the arithmetic unit and the command unit.

6. The aerial vehicle according to claim 1, wherein the arithmetic unit is configured to calculate the amount of the shape change of the aerial vehicle based on a shape change calculation function or a shape change calculation table.

7. The aerial vehicle according to claim 6, wherein the shape change calculation function is a function which correlates at least a flight time of the aerial vehicle with the amount of the shape change of the aerial vehicle, or
the shape change calculation table is a table which correlates at least the flight time of the aerial vehicle with the amount of the shape change of the aerial vehicle.

8. The aerial vehicle according to claim 6, wherein the shape change calculation function is a function which correlates at least a flight time of the aerial vehicle and a flight height of the aerial vehicle with the amount of the shape change of the aerial vehicle, or
the shape change calculation table is a table which correlates at least the fight time of the aerial vehicle and the flight height of the aerial vehicle with the amount of the shape change of the aerial vehicle.

9. The aerial vehicle according to claim 6, wherein the shape change calculation function is a function which correlates at least a flight time of the aerial vehicle and a Mach number of the aerial vehicle with the amount of the shape change of the aerial vehicle, or
the shape change calculation table is a table which correlates at least the fight time of the aerial vehicle and the Mach number of the aerial vehicle with the amount of the shape change of the aerial vehicle.

10. The aerial vehicle according to claim 6, wherein the shape change calculation function is a function which correlates at least a flight time of the aerial vehicle and an attitude angle of the aerial vehicle with the amount of the shape change of the aerial vehicle, or
the shape change calculation table is a table which correlates at least the fight time of the aerial vehicle and the attitude angle of the aerial vehicle with the amount of the shape change of the aerial vehicle.

11. The aerial vehicle according to claim 1, wherein:
the executable instructions, which when executed by the at least one processor, cause the aerial vehicle to further function as a shape measuring unit configured to measure a shape of the ablation material,
wherein the amount of the shape change of the aerial vehicle is calculated based on the measured shape of the ablation material.

12. The aerial vehicle according to claim 11, wherein the shape measuring unit is configured to measure the shape of the ablation material on a nose portion of the aerial vehicle or the shape of the ablation material on a steering wing of the aerial vehicle.

13. The aerial vehicle according to claim 1, wherein the arithmetic unit is configured to change the control parameter based on a pre-program.

14. The aerial vehicle according to claim 1, further comprising:

a plurality of attitude control mechanisms along a direction parallel to a longitudinal direction of the aerial vehicle.

15. An operation method of an aerial vehicle, the aerial vehicle comprising:
an outer surface;
at least one processor; and
at least one non-transitory memory having stored thereon executable instructions, which when executed by the at least one processor, cause the aerial vehicle to function as an arithmetic unit configured to calculate a control command using a control parameter and a control unit configured to control an attitude of the aerial vehicle or a thrust of the aerial vehicle based on the control command,
wherein at least a part of the outer surface is composed of ablation material,
wherein the arithmetic unit is configured to change the control parameter in response to an amount of a shape change of the aerial vehicle caused by disappearance of the ablation material,
wherein the control parameter includes a control gain,
the operation method comprising:
obtaining the amount of the shape change of the aerial vehicle caused by the disappearance of the ablation material;
calculating an amount of an aerodynamic coefficient change based on the amount of the shape change and a calculation function or a calculation table which correlates the amount of the shape change with the amount of the aerodynamic coefficient change;
calculating a gain compensation amount based on the amount of the aerodynamic coefficient change and a calculation function or a calculation table which correlates the aerodynamic coefficient change with the gain compensation amount; and
changing the control gain based on the gain compensation amount.

* * * * *